Sheet 2. 2 Sheets.

H. Willard.
Hay Rake & Loader.
No. 69881      Patented Oct. 15, 1867.

Witnesses                                         Inventor.

UNITED STATES PATENT OFFICE.

HOSEA WILLARD, OF VERGENNES, VERMONT.

Letters Patent No. 69,881, dated October 15, 1867.

---

IMPROVEMENT IN HAY-RAKERS AND LOADERS.

---

*The Schedule referred to in these Letters Patent and making part of the same.*

---

TO ALL WHOM IT MAY CONCERN:

Be it known that I, HOSEA WILLARD, of Vergennes, in the county of Addison, and State of Vermont, have invented a new and improved Hay-Raking and Loading Device, and that the following description, taken in connection with the accompanying drawings, hereinafter referred to, forms a full and exact specification of the same, wherein I have set forth the nature and principles of my said improvements, by which my invention may be distinguished from all others of a similar class, together with such parts as I claim, and desire to have secured to me by Letters Patent.

This invention relates to certain new and useful improvements on a machine for raking and loading hay, for which Letters Patent were granted to me, bearing date August 1, 1866.

The invention consists, first, in an improved means for discharging the elevated hay from the upper part of the endless elevator, whereby the hay is discharged at the point specified in a perfect manner.

The invention consists, second, in an improved application of the endless elevator to the machine, whereby the teeth of the elevator are allowed to yield or give perfectly to obstacles which may be in their path, or yield to inequalities of the surface of the ground.

The invention consists, third, in the application of wing-rakes to the machine, and endless feeders or conveyers connected therewith, whereby the machine is made to operate over a comparatively wide area, and rendered available for raking up and loading hay as left on the field by the mowing machine.

In the accompanying sheets of drawings—

Figure 1:
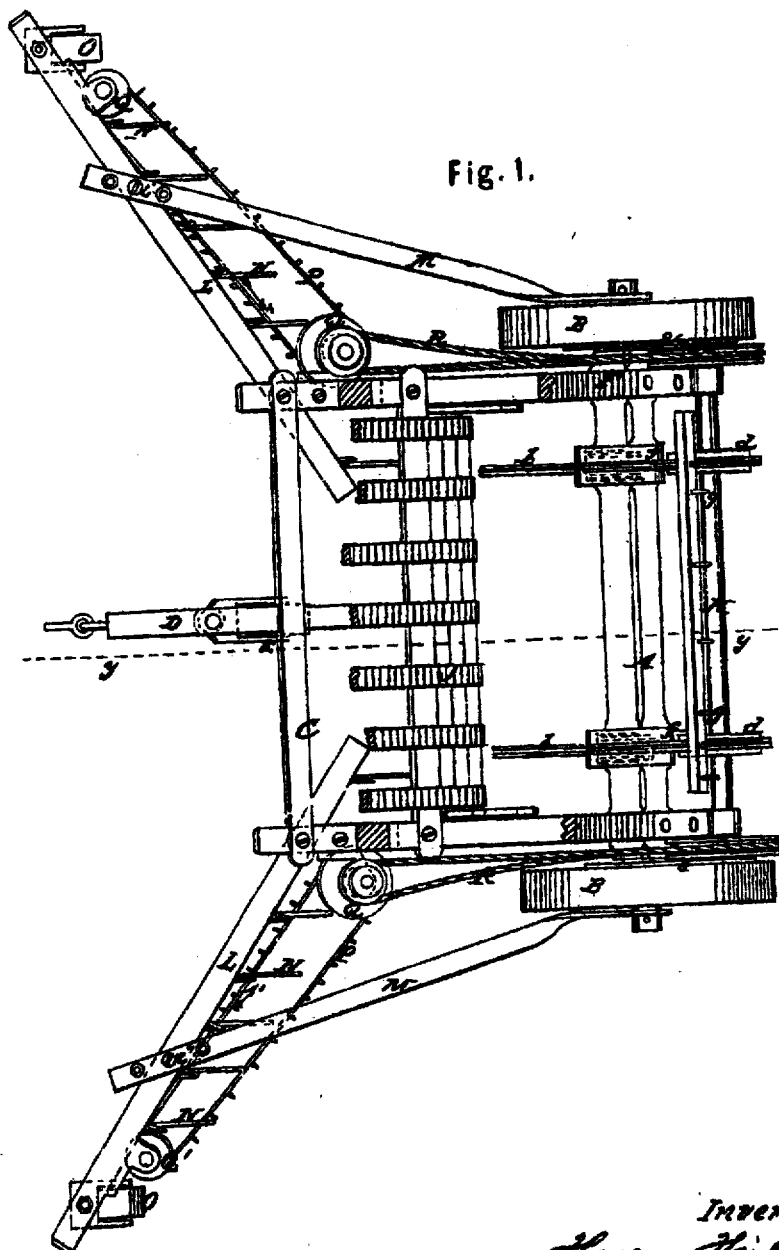
Figure 2:
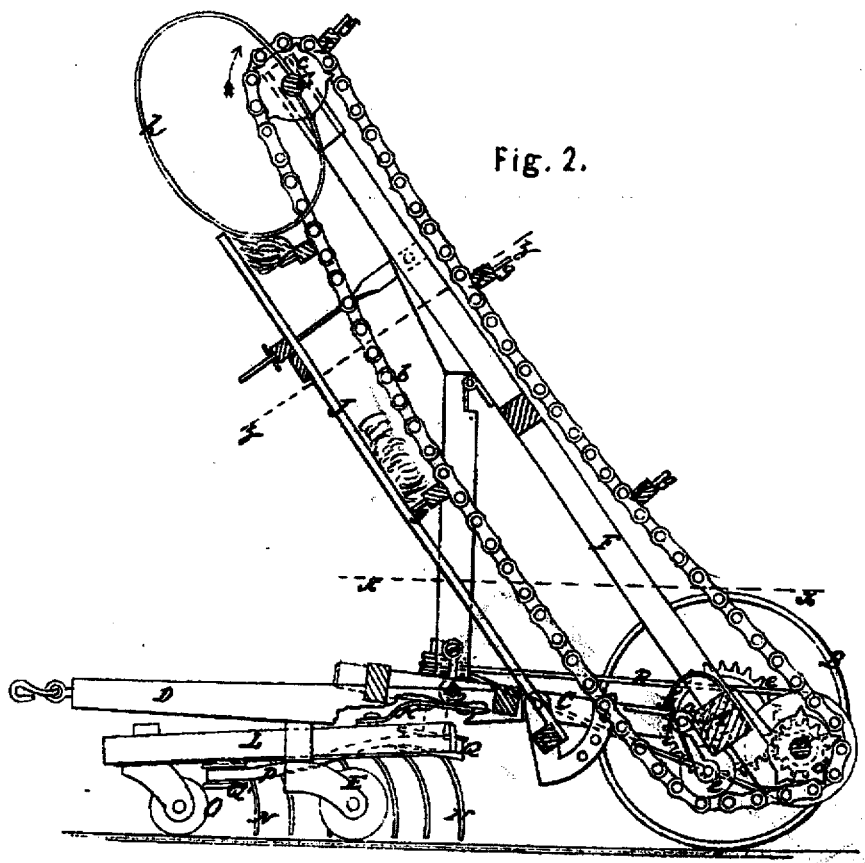

Figure 1, Sheet No. 1, is a horizontal section of my invention, taken in the line $x\ x$, fig. 2.

Figure 2, a side sectional view of the same, taken in the line $y\ y$, fig. 1.

Figure 3:
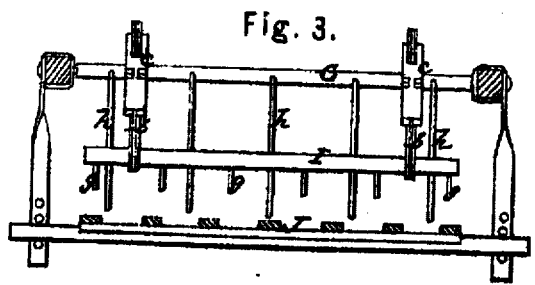

Figure 3, a transverse section of the same, taken in the line $z\ z$, fig. 2.

Similar letters of reference indicate like parts.

A represents an axle, having a wheel, B, on each end of it, the axle being fixed and the wheels turning upon it. C is a rectangular frame, which is connected to the axle A by hinges $a\ a$, and has a pole, D, attached, supported by a caster-wheel, E. The implement is secured to the rear of a cart or wagon by means of this pole. F is an inclined frame, permanently attached to the axle A, and having a shaft, G, in its upper part, the bearings of which are adjustable, to admit of the endless elevator being kept at a proper state of tension at all times. This elevator is composed of two endless chains $b\ b$, which pass around pulleys $c\ c$ on the shaft G, and around pulleys $d\ d$ on a shaft, H, the bearings of which are attached to the lower end of the frame F, said shaft being driven by gears $e$ from the wheels B, arranged precisely in the same way as shown in the original invention. The chains also pass around pulleys $e\ e$, which are attached to springs or elastic plates $f$, secured to the axle A, as shown more particularly in fig. 1. These pulleys $e\ e$ are directly underneath the axle A, and over the line where the teeth $g$ rake up the hay; said teeth being attached to cross-bars I, which are connected to the chains $b\ b$. These rakes are arranged in precisely the same way as in the original machine, and they travel up over an inclined frame, J, which is also like the one shown in the original machine. On the shaft G there are secured wires, $h$, bent in oval form, as shown in fig. 1. Any suitable number of these wires may be used, and they are designed to serve as cleaners, to free or detach the hay from the teeth $g$, and insure the discharge of the former from the teeth at the top of the inclined frame J. The rotation of the cleaners $h$ effectually detaches the hay from the teeth $g$, and insures its discharge upon the load, and the yielding pulleys $e\ e$ admit of the teeth $g$ and bars I giving or yielding to any irregularities of surface over which they may pass, and also yielding to obstructions which may be in their path. This is an important feature of the invention. To each side of the front part of the frame C there is attached a spring, K, and to these springs bars L are secured, one to each. These bars L extend out obliquely from the frame C, and are retained in position by metal rods or bars M, the rear ends of which are fitted loosely on the ends of the axle A, and the front ends attached to the bars L, the rods or bars M being perforated with a plurality of holes, through any of which screws or bolts $i$ may pass into the bars L, according to the position required for said bars, a greater or less degree of obliquity being given them by this adjustment. The bars L are provided with teeth N, similar to wire rake-teeth, and the outer ends of the bars L are supported by caster-wheels O. The springs K, to which the inner ends of the bars L are attached, admit of said bars rising and falling to conform to the inequalities of surface over which they may pass. P P represents endless belts, which pass around pulleys Q Q', the latter, Q', being attached to the outer parts of the bars and the former, Q, attached to the frame C, the pulleys Q being adjustable, or so arranged or applied that they may be placed higher or lower, as may be required. The pulleys Q are driven by belts R from the shaft H. The belts P are provided with short teeth $j$, and they rotate in the direction indicated by arrow 1, and serve to feed the hay towards the frame C, and in the path of or directly before the endless elevator. These toothed bars or wing-rakes are an essential feature of the invention, as they enable the machine to work over a wide area, and render it efficient in raking up hay as left by the mowing machine, that is to say, not raked up in windrows.

Having thus described my invention, I claim as new, and desire to secure by Letters Patent—

1. The supplementary yielding pulleys $c\ c$ attached to the axle A, and at such points that the rake-teeth of the endless elevator may yield or conform to the inequalities of surface over which they may pass, or to obstructions which may be in their path, substantially as and for the purpose specified.

2. The oval wires or clearers $h$ placed on the shaft G of the endless elevator, substantially as and for the purpose set forth.

3. The springs K, for connecting the oblique rake-wings to the frame C, arranged as described, for the purpose specified.

4. The endless belts P P applied to the rake-wings, substantially in the manner as and for the purpose set forth.

HOSEA WILLARD.

Witnesses:
   L. MEADER,
   E. H. WOODBRIDGE.